United States Patent

[11] 3,593,033

[72] Inventors Tetsuji Shimizu;
Sinichi Ueno; Susumu Usami, all of Nagoya, Japan
[21] Appl. No. 755,623
[22] Filed Aug. 27, 1968
[45] Patented July 13, 1971
[73] Assignee Kabushiki Kaisha Tokai Rika Denki Seisakusho, Aza-Sunairi, Oaza-Shimoodai Nishibrwajima-cho, Nishikasugai-gun Aichi Prefecture, Japan
[32] Priority Sept. 19, 1967
[33] Japan
[31] 42/59631

[54] DEVICE FOR ENERGIZING SEQUENTIALLY PLURAL LOADS
3 Claims, 1 Drawing Fig.

[52] U.S. Cl. 307/223 B, 307/241, 307/252 Q, 328/75, 328/78, 328/106, 315/323
[51] Int. Cl. H03k 21/00, H03k 17/00
[50] Field of Search 307/252, 241, 223, 220—225; 328/75, 78, 79, 106, 130; 315/323

[56] References Cited
UNITED STATES PATENTS

| | | | |
|---|---|---|---|
| 3,450,901 | 6/1969 | Dick | 328/130 |
| 3,456,131 | 7/1969 | Adem | 307/252 |

*Primary Examiner*—Donald D. Forrer
*Assistant Examiner*—David M. Carter
*Attorney*—McGlew and Toren

ABSTRACT: A device fo: energizing sequentially and at a given time interval plural loads, such as an electric lamps relays, or a solenoids and deenergizing simultaneously all loads, at a lapse of a certain time after the final load has been energized, does not use any mechanical switching elements. The device comprises an electric circuit consisting of plural stages connected in parallel to a source of electric potential and each including a load and an SCR connected in series. Each stage includes a pair of series-connected variable resistors connected between the cathode of the SCR of one stage and the gate of the SCR of the next succeeding stage, and a condenser connected between the source and the junction point between the pair of series-connected variable resistors.

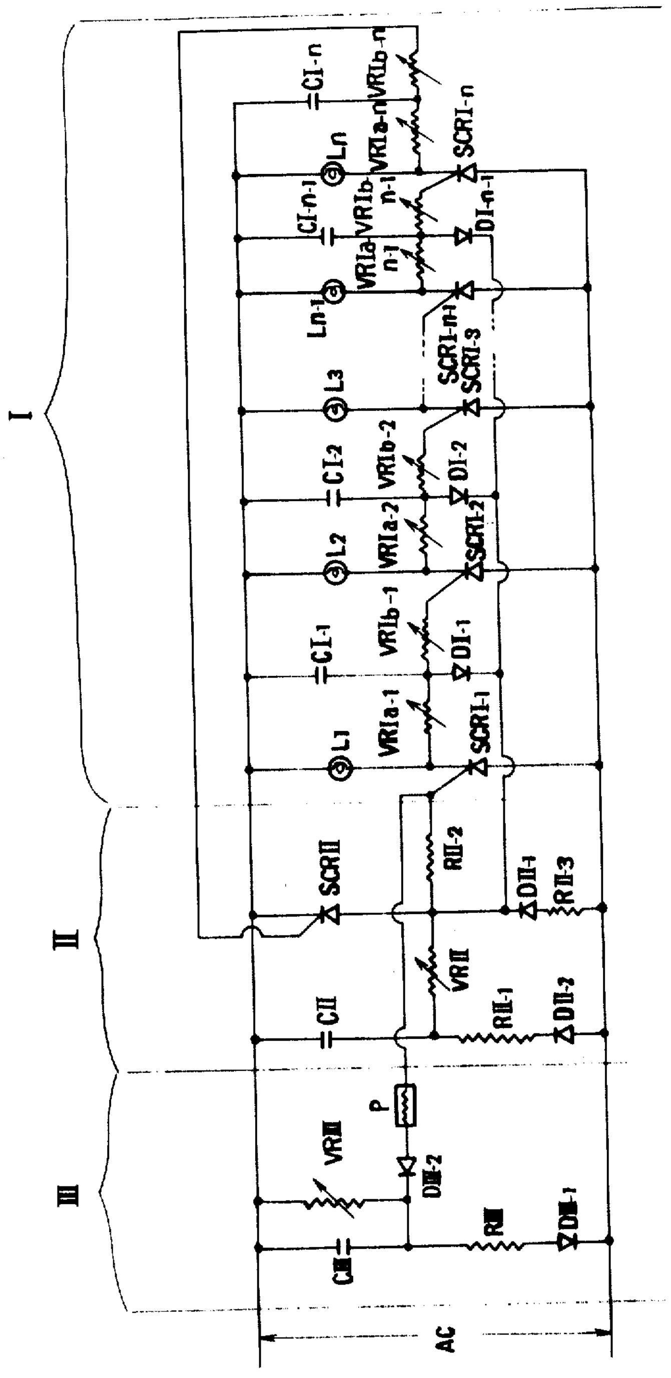
INVENTORS
TETSUJI SHIMIZU
SINICHI UENO
SUSUMU USAMI
BY
McGlew and Toren
ATTORNEYS

DEVICE FOR ENERGIZING SEQUENTIALLY PLURAL LOADS

The present invention relates to a device for energizing sequentially plural loads.

An object of the present invention is to provide a device for energizing sequentially and at a given time interval plural loads, such as electric lamps, relays or solenoids, and deenergizing simultaneously all the loads after a lapse of a certain time after the final load has been energized.

Another object of the present invention is to provide a device for energizing sequentially plural loads so constructed that operation, such as mentioned hereinabove, is initiated and suspended automatically according to the intensity of ambient illumination.

BRIEF DESCRIPTION OF THE DRAWING

In the drawing, the single FIGURE is a schematic wiring diagram of a device for energizing sequentially plural loads embodying the invention.

DESCRIPTION OF THE PREFERRED EMBODIMENT

With reference to the single FIGURE of the drawing, the device embodying the invention consists of a load energizing circuit division I, a controlling circuit division II and an illumination reference circuit division III. In order to clarify the operation of the invention, each of these circuit divisions will be described separately.

In the load energizing circuit division I, silicon control rectifier elements $SCR_{I-1}$, $SCR_{I-2}$, ... $SCR_{I-n-1}$ and $SCR_{I-n}$ have their respective anodes connected to one terminal of a source of AC electric potential, and their cathodes are connected to the other terminal of the AC potential source through respective loads $L_1$, $L_2$, $L_3$, ... $Ln$-1 and $Ln$. Connection between two adjacent silicon control rectifiers, for example $SCR_{I-1}$ and $SCR_{I-2}$, is such that $SCR_{I-1}$ is connected at its cathode to a gate circuit of $SCR_{I-2}$ through a pair of series-connected variable resistors $VR_{Ia-1}$ and $VR_{Ib-1}$, and a condenser $C_{I-1}$, connected to the junction point between variable resistors $VR_{Ia-1}$ and $VR_{Ib-2}$ is connected to such other terminal of the AC potential source. Connections between $SCR_{I-2}$ and $SCR_{I-3}$, $SCR_{I-3}$ and $SCR_{I-n-1}$, and $SCR_{I-n-1}$ and $SCR_{I-n}$ are made in the same manner.

In the controlling circuit division II, a diode $D_{II-2}$ is connected at its anode to one terminal of the AC potential source and at its cathode to the other terminal of the AC potential source through a resistor $R_{II-1}$ and a condenser $C_{II}$. A resistor $R_{II-3}$ is connected at one end to one terminal of the AC potential source and at the other end to the anode of the diode $D_{II-1}$. Diode $D_{II-1}$ is connected at its cathode to the anode of $SCR_{II}$, the cathode of which is connected to the other terminal of the AC potential source. A variable resistor $VR_{II}$ has one end thereof connected to a point between the condenser $C_{II}$ and the resistor $R_{II-1}$, and is connected at its other end to the anode of $SCR_{II}$. Diodes $D_{I-1}$, $D_{I-2}$, ... $D_{I-n-1}$ have their anodes connected to respective junction points between the pairs of variable resistors $VR_{Ia-1}$ and $VR_{Ib-1}$, $VR_{Ia-2}$ and $VR_{Ib-2}$, ... $VR_{Ia-n-1}$ and $VR_{Ib-n-1}$ and are connected at their respective cathodes to the anode of $SCR_{II}$ construction of the controlling circuit division II.

The structure of the illumination reference circuit division III is such that a diode $D_{III-1}$ is connected at its cathode to one terminal of the AC potential source, and at its anode to the other terminal of the potential source through a resistor $R_{III}$ and a condenser $C_{III}$ connected in series. To a point between the resistor $R_{III}$ and the variable resistor $VR_{III}$, the cathode of a diode $D_{III-2}$ is connected, and the anode thereof is connected to the gate circuit of $SCR_{I-1}$ through a photoconductive element P formed of cadmium sulfide.

The described device operates in a manner which will now be set forth, with the description being divided into two sections, the first section describing the operation of the device without the illumination reference circuit division III and with the second section describing the operation of the device including this illumination reference circuit division.

In the device without the illumination reference circuit division III when the potential source is closed, the alternating current flows to the gate circuit of $SCR_{I-1}$ through two parallel circuits, one including the resistor $R_{II-3}$ and the diode $D_{II-1}$ the variable resistor $VR_{II}$, and resistor $R_{II-2}$ whereby $SCR_{I-1}$ becomes in conductive state for a half cycle, during which a positive potential is applied at the anode of $SCR_{I-1}$, and current flows through load $L_1$. As a result, the condenser $C_{I-1}$ is charged to an ohmic value which approximates the sum of ohmic value of the $VR_{Ib-1}$, $L_2$ and that between the gate circuit and the cathode of $SCR_{I-2}$ divided by the sum of the ohmic value of $VR_{Ia-1}$, $VR_{Ib-1}$, $L_2$ and that between the gate circuit and the cathode of $SCR_{I-2}$. When $SCR_{I-1}$ is turned to a nonconductive state, the charge of the condenser $C_{I-1}$ is discharged nearly to zero through a loop including the condenser $C_{I-1}$, the variable resistor $VR_{Ia-1}$ and the load $L_1$ and another loop including the condenser $C_{I-1}$, the variable resistor $VR_{Ib-1}$ and the gate circuit and the cathode of $SCR_{I-2}$, and the load $L_2$. Each stage of the circuit is given a time constant having a period longer than that of the source of electric potential, so that the DC potential of the condenser $C_{I-1}$ increases at the side near the resistor $VR_{Ia-1}$. The diode $D_{II-1}$ serves to prevent the condensers $C_{I-1}$, $C_{I-2}$, ... and $C_{In-1}$ from discharging through the respective diodes $D_{I-1}$, $D_{I-2}$, and $D_{In-1}$ and the resistor $R_{II-3}$. When the potential of the condenser $C_{I-1}$ increases, gate current of $SCR_{I-2}$ flowing through the variable resistor $VR_{Ib-1}$ increases sufficiently to trigger $SCR_{I-2}$, conductive. $SCR_{I-3}$, ... $SCR_{I-n-1}$ and $SCR_{I-n}$ are energized successively in the same manner as $SCR_{I-2}$. Immediately after $SCR_{I-n}$ becomes conductive, the DC potential of the condenser $C_{I-n}$ is raised sufficiently to supply a gate current to $SCR_{II}$ through the variable resistor $VR_{Ib-n}$, thereby energizing $SCR_{II}$. To $SCR_{II}$ current from the AC potential source flows through the resistor $R_{II-3}$ and the diode $D_{II}$. Note that there is provided the circuit including the diode $D_{II-2}$, the resistor $R_{II-1}$ and the condenser $C_{II}$, in order to prolong the energizing period of $SCR_{II}$. That is, the alternating current is converted to direct current by the circuit, and the thus provided direct current flows to $SCR_{II}$ through the variable resistor $VR_{II}$, after $SCR_{II}$ becomes conductive, whereby a current more than the holding current of $SCR_{II}$ is retained for a certain time period determined by the condenser $C_{II}$ and the variable resistor $VR_{II}$. As soon as $SCR_{II}$ is energized, current flowing to the gate circuit of $SCR_{I-1}$ through the resistor $R_{II-2}$ is cut off, deenergizing $SCR_{I-1}$. The respective condensers $C_{I-1}$, $C_{I-2}$, ... and $C_{I-n-1}$ discharge through the corresponding diodes $D_{I-1}$, $D_{I-2}$ and $D_{I-n-1}$ and through $SCR_{II}$, which results in cutting off the gate current of $SCR_{I-2}$, $SCR_{I-3}$ ... $SCR_{I-n-1}$ and $SCR_{I-n}$ and deenergizing the respective loads $L_1$, $L_2$, $L_3$ ... $Ln$–1 and $Ln$. When the direct current flowing from the condenser $C_{II}$ decreases below the holding current of $SCR_{II}$, $SCR_{II}$ is cut off. At this time, the condenser $C_{I-n}$ discharges current through a loop including the variable resistor $VR_{Ib-n}$, and gate circuit and the cathode of $SCR_{II}$, but the current does not flow through $SCR_{II}$.

Thus, the current again flows to the gate circuit of $SCR_{I-1}$ through two parallel circuits, one including the resistor $R_{II-3}$ and the diode $D_{II}$, another including the resistor $VR_{II}$, and further through the resistor $R_{II-2}$, thereby energizing $SCR_{I-1}$. In the same manner, $SCR_{I-2}$, $SCR_{I-3}$, $SCR_{I-n-1}$ and $SCR_{I-n}$ are energized successively, and then deenergized simultaneously. This is repeated as long as the source of AC potential is connected to the circuit.

The device to which the illumination reference circuit division III is combined, operates as follows.

In addition to the circuit as previously described, the diode $D_{III-1}$ is connected at its cathode to one terminal of the source of electric potential and at its anode to the resistor $R_{III}$. The condenser $C_{III}$ and the variable resistor $VR_{III}$ are interconnected between resistor $R_{III}$ and other terminal of the potential source, thereby providing negative potential at both ends of the variable resistor $VR_{III}$ through the resistor $R_{III}$. The diode $D_{III-2}$ is connected at its cathode to a point between the resistor $R_{III}$ and the variable resistor $VR_{III}$, and at its anode to the gate circuit of $SCR_{I-1}$ through the photoconductive element P, whose resistance increases with decrease of intensity of illumination incident thereupon. The gate potential of $SCR_{I-1}$ is given by the negative potential of the connecting point of the condenser $C_{III}$ with the resistor $R_{III}$, and the positive potential of the connecting point of the variable resistor $VR_{II}$ with the anode of $SCR_{II}$ divided by the ohmic values of the resistor $R_{II-2}$ and the photoconductive element P. When the resistance of the photoconductive element P decreases, the gate potential of $SCR_{I-1}$ is negative, and $SCR_{I-1}$ is left nonconductive. Accordingly, $SCR_{I-2}$, $SCR_{I-3}$, $SCR_{I-n-1}$ and $SCR_{I-n}$ remain in the nonconductive state. When the intensity of illumination incident upon the photoconductive element P decreases and the resistance increases, current flows to the gate circuit and the cathode of $SCR_{I-1}$ to energize $SCR_{I-1}$. In this connection, the diode $D_{III-2}$ is important to block flow of current to the gate circuit and the cathode of $SCR_{I-1}$. If the diode $D_{III-2}$ is not incorporated, and when $SCR_{I-1}$ is in conductive state, the potential of the gate circuit of $SCR_{I-1}$ becomes substantially equal to that of other terminal of the potential source. Consequently, the condenser $C_{III}$ is charged with the direct current flowing from the $SCR_{I-1}$ through the photoconductive element P, and the direct current charged in the condenser $C_{III}$ flows continuously to the gate circuit of $SCR_{I-1}$ through the photoconductive element P. Accordingly, once $SCR_{I-1}$ is energized, $SCR_{I-1}$ is maintained in conductive state, irrespective of energization of $SCR_{II}$. In order to provide the necessary cutoff of current flow to the gate circuit of $SCR_{I-1}$, the diode $D_{III-2}$ is connected with a polarity blocking flow of the positive current to the gate circuit of $SCR_{I-1}$, when $SCR_{II}$ becomes energized. Thus, $SCR_{I-1}$ is cut off, when $SCR_{II}$ becomes conductive.

The invention having the construction as disclosed hereinabove can not only attain the objects disclosed in the preamble, but also provides a device having circuits of a simple structure and operating with no error.

What We claim is:

1. A device for energizing plural loads sequentially comprising, in combination, an electric circuit including plural stages connected in parallel to a source of electric potential, with each stage including a load and an SCR connected in series; each stage including a respective pair of variable resistors interconnected between a cathode of the SCR of the preceding stage and the gate circuit of the SCR of the respective stage; respective condensers, each connected between the source of electric potential and a respective junction point of a respective pair of variable resistors, whereby said plural loads are energized sequentially at predetermined time intervals; and a further SCR connected in parallel with said condensers to complete a discharge circuit therefor, whereby all said loads are deenergized responsive to conduction of said further SCR.

2. A device for energizing plural loads sequentially comprising, in combination, an electric circuit including plural stages connected in parallel to a source of electrical potential, with each stage including a load and an SCR connected in series; each stage including a respective pair of variable resistors interconnected between a cathode of the SCR of the preceding stage and the gate circuit of the SCR of the preceding stage and the gate circuit of the SCR of the respective stage; respective condensers, each connected between the source of electric potential and a respective junction point of a respective pair of variable resistors, whereby said plural loads are energized sequentially at predetermined time intervals, said device further comprising a first series circuit including a fist diode, a first resistor and a further condenser, and a second series circuit including a second diode and a further SCR; said first and second series circuits being connected in parallel to the source of electric potential, thereby completing a closed circuit; a further variable resistor connected between the anode of said further SCR and the junction point of said first resistor and said further condenser; respective third diodes each connected in series with a respective one of said first mentioned condensers, the anode of said further SCR being connected to the cathodes of each of said third diodes; and a second resistor connected between the anode of said further SCR and the gate circuit of the SCR of the first stage of said plural circuits; whereby said plural loads are energized sequentially and at a predetermined time interval, and are deenergized simultaneously after all of said loads have been energized.

3. A device for energizing plural loads sequentially, as claimed in claim 2, further comprising a third series circuit including a fourth diode, a third resistor and an additional condenser, and connected in parallel to the potential source; a fourth series circuit including an additional variable resistor, connected in parallel with said additional condenser, a fifth diode and a photoconductive element connected to the gate circuit of the SCR of the first stage of said plural stages; said third and fourth series circuits constituting an illumination reference circuit; said illumination reference circuit automatically initiating and interrupting operation of said device in accordance with the intensity of ambient illumination effective on said photoconductive element.